United States Patent [19]

Nakamura et al.

[11] Patent Number: 4,555,422
[45] Date of Patent: Nov. 26, 1985

[54] HEAT SHRINKABLE MAGNETIC SHIELDING ARTICLE

[75] Inventors: Koichi Nakamura, Numazu; Masashi Ishibashi, Chiba; Hideki Kameda, Yachiyo; Minoru Makiyo, Inba, all of Japan

[73] Assignee: Fujikura Ltd, Tokyo, Japan

[21] Appl. No.: 569,634

[22] Filed: Jan. 10, 1984

[30] Foreign Application Priority Data

Jan. 15, 1983 [JP] Japan ................................ 58-004755

[51] Int. Cl.$^4$ ............................................. F16L 00/00
[52] U.S. Cl. ...................................... 428/36; 428/174; 428/215; 428/329; 428/414; 428/423.7; 428/424.2; 428/447; 428/483; 428/521; 428/900; 428/35; 523/137; 174/DIG. 8
[58] Field of Search ................. 174/DIG. 8; 523/137; 428/35, 900, 329, 447, 483, 521, 36, 174, 215, 414, 423.7, 424.2

[56] References Cited

U.S. PATENT DOCUMENTS

| | | | |
|---|---|---|---|
| 3,086,242 | 4/1963 | Cook et al. ............................... | 18/1 |
| 3,379,218 | 4/1968 | Coude . | |
| 3,455,336 | 7/1969 | Ellis . | |
| 3,576,387 | 4/1971 | Derby ........................ | 174/DIG. 8 X |
| 3,950,604 | 4/1976 | Penneck ........................... | 428/913 X |
| 4,116,906 | 9/1973 | Ishino . | |
| 4,118,704 | 10/1973 | Ishino . | |
| 4,168,192 | 9/1979 | Nyberg ...................... | 174/DIG. 8 X |
| 4,207,364 | 6/1980 | Nyberg ...................... | 174/DIG. 8 X |
| 4,297,522 | 10/1981 | Jesse et al. . | |

FOREIGN PATENT DOCUMENTS 2026890 12/1971 Fed. Rep. of Germany ....... 523/137
57-080461  5/1982 Japan .................................... 523/137

OTHER PUBLICATIONS

Hawley, The Condensed Chemical Dictionary, 1971, pp. 384–385.

Primary Examiner—Joseph L. Schofer
Assistant Examiner—S. Babajko
Attorney, Agent, or Firm—Sprung Horn Kramer & Woods

[57] ABSTRACT

An article comprising a magnetic shielding thermoplastic polymeric material containing a powdery ferrite and a heat shrinkable thermoplastic polymeric material layer. Due to its specific structure, this article is excellent in applicability over any electrical component, and may provide over the component a cover having excellent magnetic shielding and mechanical strength properties. It may also bring about a substantial increase in inductance of the component.

14 Claims, 6 Drawing Figures

HEAT SHRINKABLE MAGNETIC SHIELDING ARTICLE

This invention relates to a heat shrinkable magnetic shielding article. More particularly, this invention is concerned with an article comprising a heat shrinkable layer and, arranged under the layer, a magnetic shielding layer, which article can readily form on an electrical component by application of heat alone such a cover as will function as a magnetic shielding or electromagnetic wave absorber over the component and, at the same time, increase the inductance of the component. The present invention is also concerned with a method for providing a magnetic shielding over an electrical component.

The recent progress of communication and electronic devices is remarkable. They are increasingly minified, and the demand for improved productivity and function stability of such devices is very great in the art. In accordance with this trend in the art, it is increasingly demanded to further minify the electrical components, such as those having an inductance, to be incorporated in such devices, and enable the electrical components to be arranged in close proximity to each other. In coping with these demands, one problem to be solved is electric shielding. The electric shielding implies any means of avoiding pickup of undesired signals or noise, suppressing radiation of undesired signals or confining wanted signals to desired paths or regions. The electric shielding includes electrostatic shielding and magnetic shielding.

Currently, the plates of iron, permalloy and sintered ferrite are employed to cope with magnetic shielding. In particular, these plates are provided on an electrical component, such as electron tube, ultralow frequency filter choke coil for the voice signal circuitry in a radio, television set and video tape recorder and noise filter circuitry for a small power switching, for the purpose of magnetic shielding. However, the employment of these materials is accompanied by various drawbacks. One drawback is that it is difficult to obtain a magnetically shielded component with accurately predetermined size. Another drawback is that the productivity is low and the number of steps is inevitably large in the process in which a plate is applied onto a component by the use of an adhesive. A further drawback is that it is generally difficult to protect only the really important portion of a circuit by the use of such a plate. With a view to overcoming these drawbacks, it has been proposed to use a heat shrinkable article comprising an elastomeric copolymer of ethylene and propylene and a powdery ferrite. Further investigations have revealed, however, that this article is also insufficient from the viewpoint of simultaneously accomplishing the magnetic shielding and ensuring the heat shrinkable property. Illustratively stated, there was investigated the effect of a sheet cover composed of an elastomeric copolymer of ethylene and propylene and a NiO/ZnO ferrite having a particle size of 3 microns and a magnetic permeability of 150, which cover has a thickness of 1.5 mm, on the inductance (L) of a coil having a drum diameter of 10 mm. The inductance is a property of an electric circuit by which an electromotive force is induced in it by a variation of current either (1) in the circuit itself or (2) in a neighboring circuit, which is expressed in henrys and is dependent upon the size, shape and relative positions of the circuits and upon the proximity of magnetic materials.

With respect to the above-defined combination of the sheet cover and the coil, an increase in inductance of the coil generally means an increase in magnetic shielding effect of the sheet cover. The relative inductance of the coil at a frequency of 100 KHz was measured to be 135, 192 and 225 when the ferrite content of the cover sheet was 60% by weight, 80% by weight and 85% by weight, respectively, as compared with 100 when the coil had no cover sheet. From this data, it can be concluded that to impart an inductance of 200 or more to the coil, it is requisite that the ferrite content of the sheet cover having a thickness of 1.5 mm be as high as 85% by weight. On the other hand, to impart to the cover sheet heat shrinkable properties, i.e. plastic memory characteristics, an elongation treatment must be applied in the manufacture of the cover sheet. With respect to heat shrinkable properties, i.e. plastic memory characteristics, of thermoplastic materials, reference may be made to, for example, U.S. Pat. Nos. 3,086,242, 3,379,218, 3,455,336 and 2,027,962 and U.K. Pat. No. 1,506,242. In successfully conducting the elongation treatment, the material must exhibit, at a temperature close to its softening point, a sufficient elongation at break which is generally more than about 30%. With respect to the composition composed of an elastomeric copolymer of ethylene and propylene and a varied content of powdery NiO/ZnO ferrite having a particle size of 3 microns and a magnetic permeability of 150, the elongation at break was measured at 60° C. The values of the elongation at break were 250%, 15% and 0%, respectively, when the ferrite contents were 60% by weight, 80% by weight and 85% by weight. Therefore, when the ferrite content is below about 80% by weight, the composition can undergo a successful elongation treatment. However, when the ferrite content is more than about 80% by weight, the composition cannot undergo a successful elongation treatment. Likewise, it was confirmed that when a MnO/ZnO ferrite having a particle size of 3 microns and a magnetic permeability of 1500 was employed, the ferrite content of the sheet cover was needed to be as high as 87% by weight to increase the relative inductance of the coil to 200 or more as compared with 100 when the coil had no cover sheet. However, the composition having a ferrite content of 87% by weight exhibited an elongation at break of 0° at 60° C. so that the composition could not undergo a successful elongation treatment. As is apparent from the foregoing, the ferrite content of the sheet cover must be large to impart a high magnetic shielding. However, a large ferrite content is disadvantageous from the viewpoint of heat shrinkable properties. Therefore, the application of the sheet cover having the above-described structure is limited due to this technical dilemma.

To overcome the inherent drawbacks of the prior art, especially the above-mentioned technical dilemma, we have made intensive studies. As a result, it has been found, unexpectedly, that an article comprising a heat shrinkable layer of a thermoplastic polymeric material and, arranged under the layer, a thermoplastic polymeric material layer containing a powdery ferrite can be readily heat shrunk over an electrical component to provide an excellent magnetic shielding cover. Based on this novel finding, we have completed this invention.

It is therefore an object of the present invention to provide an article which can readily form on an electrical component by application of heat alone such a cover as will function as an excellent magnetic shielding over the component and, at the same time, increase the inductance of the component.

It is another object of the present invention to provide a method for providing such an excellent magnetic shielding over an electrical component.

The foregoing and other objects, features and advantages of the present invention will be apparent to those skilled in the art from the following detailed description and appended claims taken in connection with the accompanying drawings in which:

In FIGS. 1 to 5, like portions of like parts are designated by like numerals.

Figure 1:
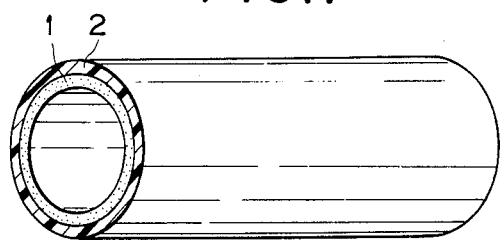
FIG. 1 is a perspective view of one form of the heat shrinkable magnetic shielding article according to the present invention.

In one and primary aspect of the present invention, there is provided a heat shrinkable magnetic shielding article which comprises:

a heat shrinkable layer comprising a thermoplastic polymeric materials;

and, arranged under the layer, directly or via an adhesive layer, a magnetic shielding layer comprising a thermoplastic polymeric material and a powdery ferrite, said magnetic shielding layer being heat shrinkable or being adapted to flow due to the force exerted by shrinkage of the heat shrinkable layer.

The article of the present invention comprises a magnetic shielding layer and superimposed on the layer, a heat shrinkable layer. The magnetic shielding layer may be compounded with a large amount of powdery ferrite. For example, the magnetic shielding layer may have a ferrite content as large as 85% by weight. Hence, the layer may exhibit an excellent magnetic shielding effect. For example, the layer, even at a thickness of 2 mm, may bring about a high relative inductance of 250 for a coil, as compared with 100 of the uncovered coil. On the other hand, the heat shrinkable properties of the article according to the present invention are completely insured by the separately installed heat shrinkable layer. Moreover, the article of the present invention is as excellent, in mechanical properties, as any of the conventional heat shrinkable thermoplastic materials. The heat shrinkable layer constituting part of the article of the present invention is composed of a polymeric material capable of having the property of plastic memory imparted thereto which is heated to above its crystalline melting temperature and expanded under pressure to a configuration greater than its normal configuration and then cooled while kept under pressure. A part treated in this manner will retain its expanded position until it is again heated to its crystalline melting temperature at which time it will shrink to its original shape. Examples of such heat shrinkable materials may be found in U.S. Pat. Nos. 2,027,962 and 3,086,242. Polymeric materials which have been cross-linked by chemical means or by irradiation, for example, with high energy electrons or nuclear radiation, are preferred for use in the present invention. Non-crystalline polymeric materials exhibiting the property of plastic or elastic memory, such as polyurethane, ionomers, etc., could also be used in practicing the present invention.

The magnetic shielding layer constituting part of the article of the present invention comprises a thermoplastic polymeric material and a powdery ferrite. This thermoplastic polymeric material may have the above-mentioned plastic memory properties, or may just flow upon application of heat due to the force exerted by the shrinkage of the heat shrinkable layer. The powdery ferrite imparts a magnetic shielding effect to this layer.

Due to its specific structure, the article of the present invention comprising the heat shrinkable layer and the magnetic shielding layer can readily form on an electrical component by application of heat alone such a cover as will function as an excellent magnetic shielding or electomagnetic wave absorber over the component and, at the same time, increase the inductance of the component.

The thickness of the heat shrinkable layer is not critical. However, it is generally in the range of from 0.2 to 2.5 mm. Also, the thickness of the magnetic shielding layer is not critical. However, it is generally in the range of from 1.0 to 2.5 mm.

The heat shrinkable magnetic shielding article of the present invention may be in a tubing form or in a planar form. When the article is in a planer form, the edges of the article may be held together by the means as suggested in, for example, U.S. Pat. Nos. 3,379,218 and 3,455,336.

Next, some embodiments of the present invention are explained below with reference to FIGS. 1 to 5.

Turning now to FIG. 1, there is shown a perspective view of one form of the heat shrinkable magnetic shielding article of the present invention. In this form, the article is composed of a magnetic shielding layer 1 comprising a thermoplastic polymeric material and a powdery ferrite as an inner layer and a heat shrinkable layer 2 as an outer layer. The inner layer and the outer layer are contacted with each other, having the same length. The outer layer is shrinkable upon application of heat. The inner layer, due to the heat applied, may also be shrinkable concurrently with the outer layer or may be flowable due to the force exerted by shrinkage of the outer layer.

Figure 2:
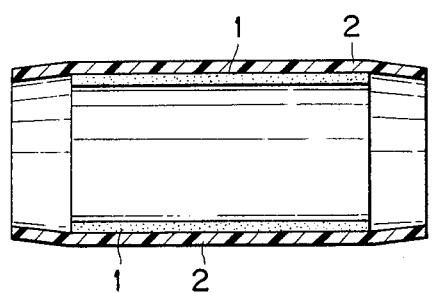
FIG. 2 is a cross-sectional view of another form of the heat shrinkable magnetic shielding article according to the present invention.

FIG. 2 illustrates another form of the heat shrinkable magnetic shielding article of the present invention which is composed of a magnetic shielding layer 1 as an inner layer and a heat shrinkable layer 2 as an outer layer. In this form, the heat shrinkable layer 2 positions around the magnetic shielding layer 1, extending over both ends thereof. In this form, also, the outer layer is shrinkable upon application of heat. The inner layer, due to the heat applied, may also be shrinkable or may be flowable due to the force exerted by shrinkage of the outer layer. Incidentally, the heat shrinkable magnetic shielding article of this form may provide a more tightly fixed magnetic shielding cover on a component as compared with that of the form shown in FIG. 1.

Figure 3:
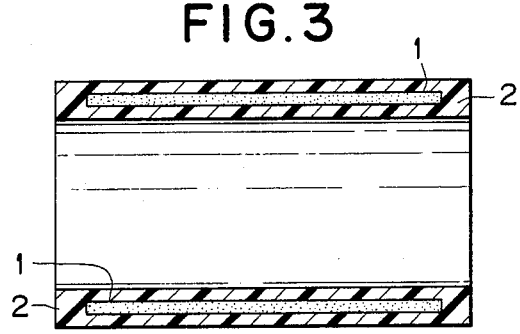
FIG. 3 is a cross-sectional view of still another form of the heat shrinkable magnetic shielding article according to the present invention.

Turning now to FIG. 3, there is shown still another form of the heat shrinkable magnetic shielding article of the present invention in which a magnetic shielding layer 1 is embedded in a heat shrinkable layer 2. In this form, even if the magnetic shielding layer 1 contains a powdery ferrite in an extremely large amount, the heat shrinkable layer can forcibly shrink the article without separation or break-down of the magnetic shielding layer.

Figure 4:
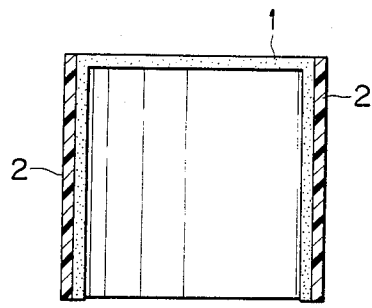
FIG. 4 is a cross-sectional view of a further form of the heat shrinkable magnetic shielding article according to the present invention.

FIG. 4 shows a further form of the heat shrinkable magnetic shielding article of the present invention which has the form of a cap. In this form, the article is composed of a cap-like magnetic shielding layer 1 and a cylindrical heat shrinkable layer 2 positioned around the cap-like magnetic shielding layer. This form is preferable from the viewpoint of shielding effect as compared with the above-mentioned forms.

Figure 5:
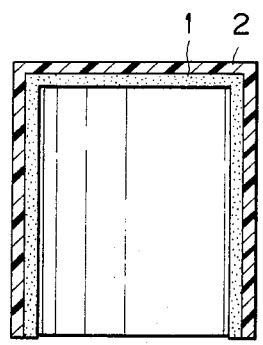
FIG. 5 is a cross-sectional view of a still further form of the heat shrinkable magnetic shielding article according to the present invention.

FIG. 5 shows a still further form of the heat shrinkable magnetic shielding article of the present invention which also has the form of a cap. In this form, the article is composed of a cap-like magnetic shielding layer 1 and a cap-like heat shrinkable layer 2 which wholly covers the cap-like magnetic shielding layer 1. In this case, the magnetic shielding layer is wholly protected by the heat shrinkable layer, as different from that shown in FIG. 4, so that separation or break-down, by an external force, of the magnetic shielding layer can be effectively prevented.

The structure of the heat shrinkable magnetic shielding article of the present invention is not limited to those as described above referring to the appended drawings. The article of the present invention may be in the form of a further multi-layer structure.

As is apparent from the foregoing, this invention is primarily concerned with a readily applicable magnetic shielding article. However, the present invention is not limited to the magnetic shielding article. The article of the present invention may be imparted with electrostatic shielding properties by incorporating an electrically conductive layer therein. As the suitable electrically conductive layer to be incorporated in the article of the present invention, there may be mentioned, for example, a thermoplastic polymeric material layer containing electrically conductive particles such as those of carbon black or metal. The electrically conductive layer may be sandwichwise disposed between the heat shrinkable layer and the magnetic shielding layer or may be disposed under the magnetic shielding layer. Alternatively, electrically conductive particles may be compounded into the heat shrinkable layer to render the layer electrically conductive.

The kind of the thermoplastic polymeric material to be employed for constituting the heat shrinkable layer may be identical with or different from that of the thermoplastic polymeric material to be incorporated in the magnetic shielding layer. As the suitable thermoplastic polymeric material, there may be mentioned polymers selected from the group consisting of (1) crystalline polymers which exhibit elastomeric properties either at or above their crystalline melting range, i.e., thermoplastic polymers and copolymers such as polytetrafluoroethylene, high molecular weight polypropylene and polyethylene, etc., and (2) crystalline polymers and copolymers, including polyolefins such as polyethylene and polypropylene, vinyls such as polyvinyl chloride and polyvinyl acetate and copolymers thereof, polyamides, etc. From these thermoplastic polymeric materials, a specific material is chosen taking into consideration the ambient temperature to which the article is exposed. Where the ambient temperature is relatively low, i.e. less than about 70° C., the magnetic shielding layer may preferably comprise an elastomeric copolymer of ethylene and propylene or the like, and the heat shrinkable layer may preferably comprise a polyolefin, such as polyethylene. On the other hand, where the ambient temperature is relatively high, i.e. from about 70° C. to 120° C., the magnetic shielding layer may preferably comprise a polyester elastomer or silicone rubber, and the heat shrinkable layer may preferably comprise a polyester elastomer or elastomeric copolymer of ethylene and propylene.

In the present invention, the heat shrinkable layer may comprise a crosslinked thermoplastic polymeric material and further at least one additive selected from the group consisting of coloring agents, basic materials, filling materials, plasticizers, crosslinking agents and antioxidants. As examples of the coloring agent to be incorporated in the heat shrinkable layer, there may be mentioned pigments such as Helio fast yellow, Hansa brilliant orange, Permanent red and the like, or dyestuffs such as Phenoform yellow, Phenoform orange, Arizarine irisol, Arizarine sky blue and the like. As examples of the filling material to be incorporated in the heat shrinkable layer, there may be mentioned a cotton linter, an asbestos, a ground quartz, a sulphite pulp and the like. As examples of the plasticizer to be incorporated in the heat shrinkable layer, there may be mentioned aromatic hydrocarbon condensate, chlorinated paraffin, chlorinated biphenyl, dicyclohexyl phthalate, diethylene glycol bis (cresyl carbonate), dihexyl phthalate, dihexyl sebacate, dimethyl sebacate, diphenyl mono-o-xenyl phosphate, ethyl phthalyl ethyl glycolate, and the like. Examples of the suitable basic materials include calcium stearate and other alkaline earth metal soaps.

The kind of the ferrite powder to be compounded with a thermoplastic polymeric material for constituting the magnetic shielding layer is not critical, and any kind of ferrite powder can be employed. Representative examples of the ferrite powder to be employed in the present invention $MnO.Fe_2O_3$, $FeO.Fe_2O_3$, $CoO.Fe_2O_3$, $NiO.Fe_2O_3$, $CuO.Fe_2O_3$ and $ZnO.Fe_2O_3$. The powdery ferrite content of the magnetic shielding layer may be in the range of from 10 to 90% by weight. If the powdery ferrite content is smaller than 10% by weight, the resulting heat shrinkable magnetic shielding article may not exert a sufficient magnetic shielding effect. On the other hand, employment of a powdery ferrite in an amount exceeding 90% by weight is also disadvantageous from the viewpoint of moldability. It is preferred that the powdery ferrite have a particle size of 3 to 300 microns.

With respect to the foregoing embodiments of the present invention as described with reference to the appended drawings, the articles do not comprise any adhesive layer between the magnetic shielding layer and the heat shrinkable layer. However, according to the present invention, it is possible to provide an adhesive layer of, for example, polyisobutylene, polyurethane, epoxy resin, nitrile rubber or neoprene between the magnetic shielding layer and the heat shrinkable layer. Alternatively, it is possible to employ a low melting point (about 60° C.) plastic as a hot-melt adhesive so as to form an adhesive layer between the magnetic shielding layer and the heat shrinkable layer by application of heat.

In another aspect of the present invention, there is provided a method for providing a magnetic shielding over an electrical component which comprises:

(1) positioning over an electrical component a heat shrinkable magnetic shielding article which comprises a heat shrinkable layer comprising a thermoplastic polymeric material and, arranged under the layer, directly or via an adhesive layer, a magnetic shielding layer comprising a thermoplastic polymeric material and a powdery ferrite, said magnetic shielding layer being heat shrinkable or being adapted to flow due to the force exerted by shrinkage of the heat shrinkable layer; and (2) heating the heat shrinkable magnetic shielding article on its side of the heat shrinkable layer to render the electrical component covered with the article.

It is preferred that covering of the electrical component by the article of the present invention be performed tightly to avoid entry of dust or moisture from the environment.

The heat shrinkable magnetic shielding article of the present invention may be produced according to the customary method as suggested in, for example, U.S. Pat. Nos. 2,027,962 and 3,086,242. When it is intended to manufacture a heat shrinkable magnetic shielding article in the form of a sleeve (i.e. cylindrical part designed to fit over another part), the composition for the magnetic shielding layer and the composition for the heat shrinkable layer are respectively shaped into tubes by extrusion using a conventional extruder. The tube for the heat shrinkable layer may be crosslinked by a chemical method or by irradiation with high energy electrons or ionizing radiation by the method disclosed in, for example, U.S. Pat. No. 3,086,242. By such procedures, the tube is imparted with plastic memory characteristics which render the tube readily heat shrinkable. The thus obtained heat shrinkable tube is placed over the ferrite-containing magnetic shielding tube. As a result, there is obtained a double-layer sleeve comprising a heat shrinkable layer as the outer layer and a magnetic shielding layer as the inner layer. It is, of course, possible to utilize this method to produce a heat shrinkable magnetic shielding sleeve having a multi-layer structure. The heat shrinkable magnetic shielding article having a cap-like structure may be produced by the method basically similar to that employed in producing the heat shrinkable magnetic shielding sleeve, except for the employment of injection molding in shaping the respective composition into a cap. When it is intended to manufacture the heat shrinkable magnetic shielding article in the form of a sheet or film, the heat shrinkable layer may be prepared by subjecting the thermoplastic sheet which has been crosslinked by any of the aforementioned methods to monoaxial or biaxial stretching so as to render the sheet axially heat shrinkable. Of course, both the cap-like article and the article in the form of a sheet or film may be produced so as to have a multi-layer structure.

As is apparent from the foregoing, the article of the present invention comprises a magnetic shielding layer which may contain a large amount of ferrite and a heat shrinkable layer which ensures ready application over an electrical component. With respect to the article of the present invention, there may be widely varied the kind of the thermoplastic polymeric material, the kind and content of the ferrite and the thickness of the respective layer. Due to its specific structure, the article of the present invention is excellent in applicability over any electrical component, and may provide over the component a cover having excellent magnetic shielding and mechanical strength properties. It may also bring about a substantial increase in inductance of the component.

The present invention will now be illustrated in more detail by the following Examples that should not be construed as limiting the scope of the invention.

EXAMPLE 1

A heat shrinkable magnetic shielding article, in the form of a sleeve, of 11.1 mm in inside diameter, which comprises a magnetic shielding layer having a thickness of 1.4 mm and a heat shrinkable layer having a thickness of 0.2 mm was prepared as follows. First, a copolymer of ethylene and vinyl acetate was extruded using an extrusion device and irradiated with ionic radiation to obtain a heat shrinkable layer in a tubular form. Next, a composition consisting of 85% by weight of a NiO/ZnO ferrite having an average particle size of 3 microns and 15% by weight of an ethylene propylene terpolymer was subjected to extrusion molding to obtain a magnetic shielding layer in a tubular form. Then, the heat shrinkable layer in a tubular form was placed over the magnetic shielding layer in a tubular form to obtain the above-defined heat shrinkable magnetic shielding article.

A piece of the heat shrinkable magnetic shielding article was heated at 150° C. for 10 minutes with a dryer. By the heating, the diameter of the article decreased to 4.1 mm from the original 11.1 mm. The shrinkability of the article was 63.1%.

Figure 6:
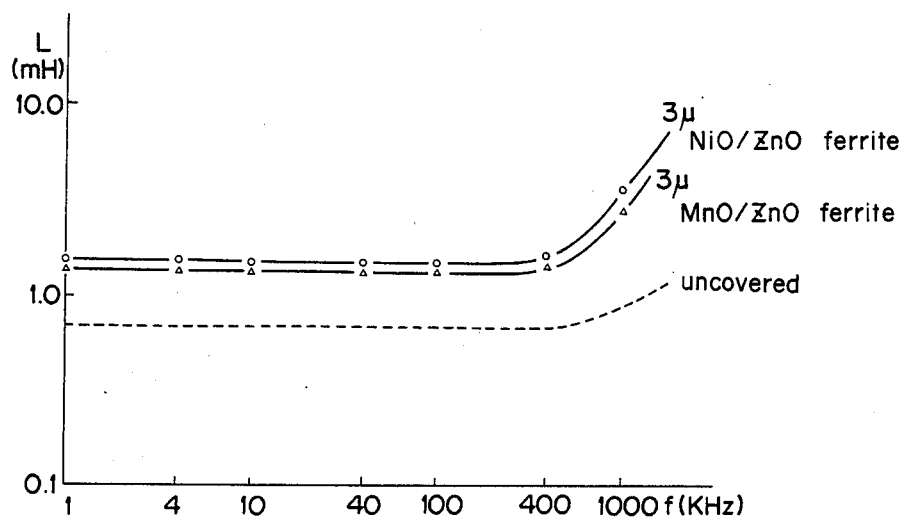
FIG. 6 is a graph showing the relationship between the frequency (f) and the inductance (L) with respect to the coil covered with the article of the present invention and the uncovered coil.

From the remaining heat shrinkable magnetic shielding article, another piece having a length of 12 mm was cut off, and placed over a coil having an outside diameter of 10 mm and a length of 12 mm. Then, the whole, i.e. the article plus the coil, was heated at 150° C. for 10 minutes with a dryer and cooled. The inductance of the coil was measured at varied frequency (1 KHz to 1 MHz). The result is as shown in FIG. 6. Incidentally, the relative value of inductance of the coil, as compared with 100 when the coil was not covered by any magnetic shielding article, was 219.0 at a frequency of 100 KHz, as illustrated in Table. Therefore, it is apparent that the above heat shrinkable magnetic shielding article brings about a substantial increase in inductance of the coil and gives a very effective magnetic shielding cover over the coil.

EXAMPLE 2

Substantially the same procedures as described in Example 1 were repeated except that a MnO/ZnO ferrite having an average particle size of 3 microns was used in place of the NiO/ZnO ferrite. The results are shown in Table. From the results, it is apparent that this heat shrinkable magnetic shielding article also brings about a substantial increase in inductance of the coil and gives a very effective magnetic shielding cover over the coil.

TABLE

| Kind of ferrite | Example 1 NiO/ZnO | Example 2 MnO/ZnO |
|---|---|---|
| Properties of respective layers | | |
| Inside diameter before shrinkage (mm) | 11.1 | 11.1 |
| Thickness of magnetic shielding layer before shrinkage (mm) | 1.4 | 1.4 |

TABLE-continued

| Kind of ferrite | Example 1 NiO/ZnO | Example 2 MnO/ZnO |
| --- | --- | --- |
| Thickness of heat shrinkable layer before shrinkage | 0.2 | 0.3 |
| Inside diameter after shrinkage (mm) | 4.1 | 3.7 |
| Shrinkage (%) | 63.1 | 66.7 |
| Inductance of coil (L)* | 219.0 | 184.9 |

*Assuming 100 when the coil was not covered by any article

What is claimed is:

1. A heat shrinkable magnetic shielding article which comprises:
   a heat shrinkable layer comprising a thermoplastic polymeric material;
   and, arranged under the layer, directly or via an adhesive layer, a magnetic shielding layer comprising a thermoplastic polymeric material and at least one powdery ferrite selected from the group consisting of $MnO.Fe_2O_3$, $FeO.Fe_2O_3$, $CoO.Fe_2O_3$, $NiO.Fe_2O_3$, $CuO.Fe_2O$ and $ZnO.Fe_2O_3$,
   said magnetic shielding layer being heat shrinkable or being adapted to flow due to the force exerted by shrinkage of the heat shrinkable layer,
   said ferrite being contained in the magnetic shielding layer in an amount of from 10 to 90% based on the total weight of the layer.

2. An article according to claim 1, which further comprises a second heat shrinkable layer comprising a thermoplastic polymeric material, said layer being arranged, directly or via an adhesive layer, under the magnetic shielding layer.

3. An article according to claim 1, wherein said heat shrinkable layer comprises a crosslinked thermoplastic polymeric material.

4. An article according to claim 1, wherein said heat shrinkable layer comprises a crosslinked thermoplastic polymeric material and further at least one additive selected from the group consisting of coloring agents, basic materials, filling materials, plasticizers, crosslinking agents and antioxidants.

5. An article according to claim 1, wherein said ferrite has a particle diameter of from 3 to 300 microns.

6. An article according to claim 1, which is in a tubing form.

7. An article according to claim 6, wherein said tubing form has a circular cross section.

8. An article according to claim 1, which is in a planar form.

9. An article according to claim 1, which is in a cap form.

10. An article according to claim 1, wherein said magnetic shielding layer has a thickness of from 1.0 to 2.5 mm and said heat shrinkable layer has a thickness of from 0.2 to 2.5 mm.

11. An article according to claim 1, wherein said magnetic shielding layer comprises a copolymer of ethylene and propylene.

12. An article according to claim 1, wherein said magnetic shielding layer comprises a polyester elastomer or silicone rubber.

13. An article according to claim 1, wherein said heat shrinkable layer comprises a polyolefin.

14. An article according to claim 1, wherein said heat shrinkable layer comprises a polyester elastomer, or elastomeric copolymer of ethylene and propylene.

* * * * *

UNITED STATES PATENT AND TRADEMARK OFFICE
CERTIFICATE OF CORRECTION

PATENT NO. : 4,555,422
DATED : November 26, 1985
INVENTOR(S) : Koichi Nakamura, et al.

It is certified that error appears in the above-identified patent and that said Letters Patent is hereby corrected as shown below:

Col. 4, line 24    Correct spelling of "electromagnetic"

Col. 9, line 23    After "$CuO.Fe_2O$" insert --$_3$--

Signed and Sealed this

Eighth Day of April 1986

[SEAL]

Attest:

DONALD J. QUIGG

Attesting Officer

Commissioner of Patents and Trademarks